June 22, 1954  M. SEYMOUR  2,681,877
SUPPORTED ADHESIVE STRIP MATERIAL
Filed Feb. 14, 1950
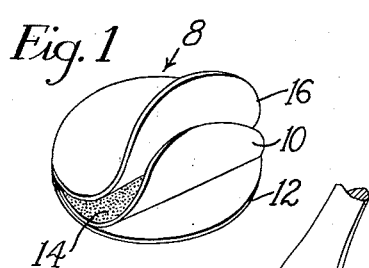
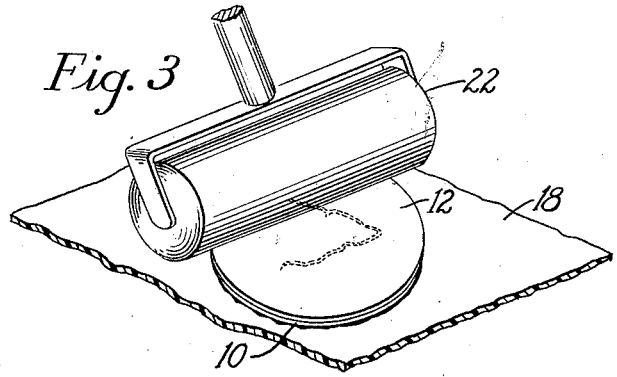
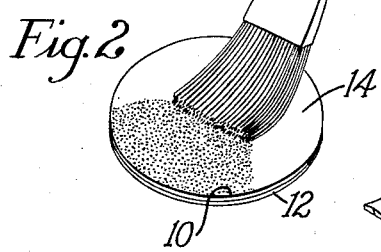
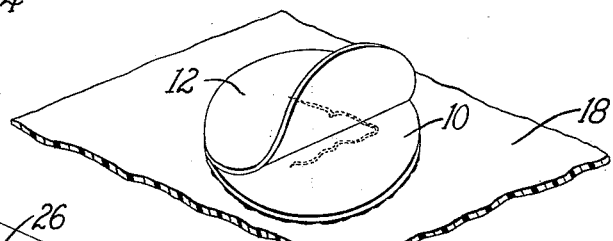
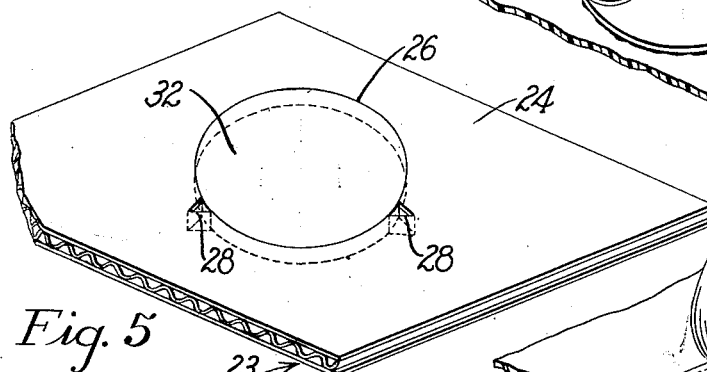
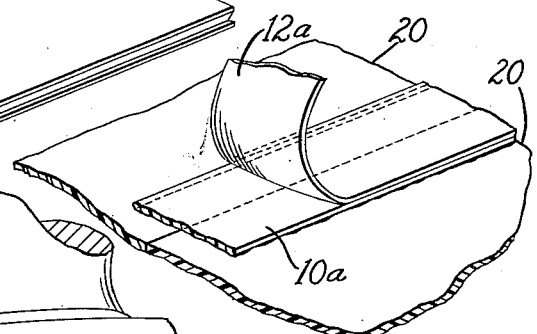
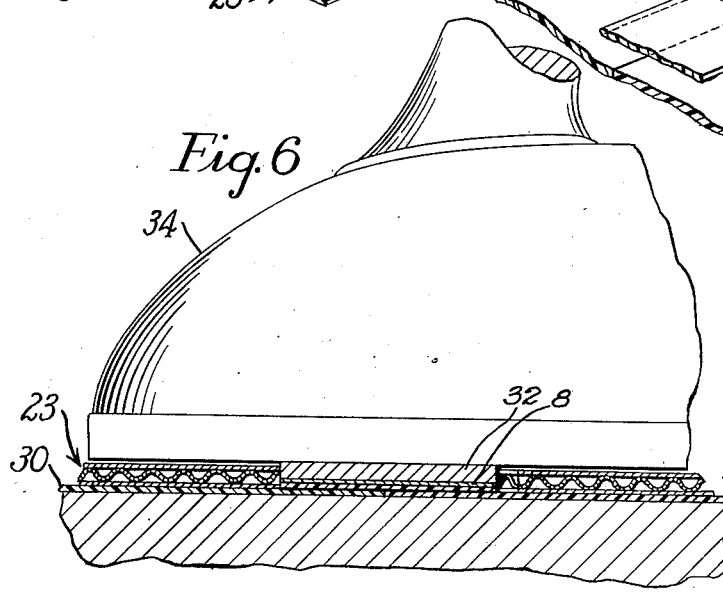
Inventor
Malcolm Seymour
By his Attorney
Thomas J. Ryan

UNITED STATES PATENT OFFICE 2,681,877

SUPPORTED ADHESIVE STRIP MATERIAL

Malcolm Seymour, Boston, Mass., assignor to B. B. Chemical Co., Boston, Mass., a corporation of Massachusetts Application February 14, 1950, Serial No. 144,147

9 Claims. (Cl. 154—95)

This invention relates to reinforcing, repairing or bonding plastic sheet material and to a novel supported plastic sheet material particularly adapted for such use.

Thin plastic sheet material, particularly polymerized vinyl resin flexible film, is being used increasingly in many fields because of its desirable appearance, strength and resistance to wear. In many of these uses, for example in inflatable objects such as cushions, play balls and upholstering, the sheet material is subjected either constantly or intermittently to considerable tension. Breaks or tears occurring in plastic sheet material subjected to tension rapidly develop in size because of the extremely low tear resistance of the material; and repair of such breaks or tears must be effected promptly to avoid irreparable damage. In general, when objects such as those above enumerated are perforated or cracked, it has not been possible to effect a satisfactory repair with equipment available in the home.

Pressure-sensitive adhesive patches are readily applied but give at best only temporary repair even where plastic sheet material is not subject to tension. Organic solvent solution adhesives would provide adequate strength of bond between a patch and a damaged sheet material; but since the patch to be acceptable must be of substantially the same thickness and type of material as the damaged sheet it will wrinkle and curl when the solvent of the adhesive is applied to it. Such patches will not adhere smoothly and uniformly to the damaged sheet. Also manipulation of such thin sheet material is extremely difficult when solvent-containing adhesive is applied to one surface. That is, the material is so flexible that almost inevitably adhesive coated portions come in contact with one another, adhere and can be separated only with considerable difficulty.

It is a feature of the present invention to provide a composite sheet or wafer adapted for simple and easy manipulation to secure a thin plastic sheet adhesively to a surface.

It is a further feature of the invention to provide a method of securing a thin, plastic sheet to a surface in an advantageous manner which eliminates previous difficulties encountered in the application of adhesive or solvent to the plastic sheet and manipulation of the sheet material.

The composite sheet or wafer of the present invention is a flexible, thin, plastic sheet material non-adhesively combined with a flexible, non-stretchable, smooth-surfaced, disposable carrier sheet, and coated on the face opposite the carrier sheet with a non-pressure sensitive, activatable adhesive. The composite of carrier sheet and plastic sheet has a stiffness which holds the plastic sheet in smooth, unwrinkled condition when the adhesive is activated and prevents the sheet from accidental bending which might bring adhesive coated portions together and cause adhesion between those portions of the surface.

The present invention involves also an extremely practical method of reinforcing, repairing or joining plastic sheets by use of the composite sheet material of the invention. The adhesive on the plastic sheet is activated and the adhesive face is pressed against the surface of plastic sheets to be reinforced, repaired or joined. Even in small repair patches where the length of free edge is large with reference to the contacting area of carrier and plastic sheets, the carrier sheet holds the plastic sheet in smooth, unwrinkled condition when activated but is readily pulled away from the plastic sheet, the plastice sheet being held by the bond between it and the surface to which it has been applied.

The property of holding the sheet flat is most unusual since the wrinkling or curling forces developed during activation are substantial, while the connection between the plastic sheet and the carrier sheet is extremely weak against a peeling action.

The invention will be further described in connection with the accompanying drawings forming part of the disclosure of the present invention.

In the drawings,

Fig. 1 is an angular view of a repair patch of supported plastic adhesive laminated sheet according to the present invention with layers folded back for purposes of illustration;

Fig. 2 is an angular view showing one method of activating the adhesive of the laminated sheet;

Fig. 3 is an angular view showing the assembly of the repair patch of supported plastic adhesive sheet and the surface of a plastic sheet to be repaired;

Fig. 4 is an angular view showing the carrier sheet partly stripped from the assembly;

Fig. 5 is an angular view of a device which may be employed in another mode of activation of the adhesive;

Fig. 6 is an elevational view partly broken away showing a method of bonding the plastic adhesive sheet to a surface employing the device shown in Fig. 5; and Fig. 7 is an angular view illustrating use of the supported plastic adhesive sheet to join two plastic sheets.

In the composite sheet 8 of the present invention a thin plastic sheet 10 is associated in intimate, clinging, but non-adhesive engagement with a relatively stiff but flexible carrier sheet 12, and a dry layer 14 of substantially non-tacky, non-pressure sensitive, activatable adhesive is bonded to the exposed face of the plastic sheet 10. This special engagement between the carrier sheet 12 and the thin plastic sheet 10 may be obtained by forming the plastic sheet directly on the carrier sheet as by calendering or by coating one face of the carrier sheet with a fluid dispersion of the plastic such as a plastisol or organisol, or with a volatile, usually organic, solvent solution of the plastic. Plastisol or organisol coatings are subsequently heated to fuse together the plastic particles to provide a continuous sheet; and solution coatings are dried to remove the solvent. These methods of forming the sheet bring the plastic and the carrier sheet into extremely intimate relation in which the plastic sheet is protected from curling and wrinkling when the adhesive is activated. The plastic material must not be keyed to the carrier sheet, however, and particularly where the plastic is applied in fluid condition, the surface of the carrier sheet must be smooth and impervious to the fluid so that the plastic material does not penetrate the surface of the carrier sheet.

Suitable carrier sheets include substantially non-stretchable, somewhat flexible sheet materials which are not soluble in the plastic, the plasticizer, or the solvent present in the plastic applied to their surface and which have a smooth imperforate surface. For reasons of cheapness and convenience in handling, a super-calendered, heavy paper sheet is preferred, but paper heavily sized with casein, glue or other coating which is not affected by the plastic, solvent, or plasticizer may be used. Other suitable supporting surfaces include Cellophane and glassine paper.

Preferred plastic materials for application to the surface of the carrier sheet to form the plastic sheet are commercially available, waterproof, polymerized vinyl resins including the vinyl chloride polymer resins, the vinyl chloride-vinyl acetate copolymer resins containing from 85% to 95% by weight of vinyl chloride, the vinyl chloride-vinylidene chloride copolymer resins and other waterproof polyvinyl resins. It is preferred that the plastic sheet on the carrier be of substantially the same thickness as the sheet or sheets of plastic to which it is to be applied for repair, reinforcement or bonding purposes. Plastic sheets from 0.002 to 0.02 inch in thickness have been found very satisfactory.

On the exposed surface of the plastic sheet a layer 14 of activatable adhesive in dry substantially non-tacky and non-pressure sensitive condition is provided. In a preferred embodiment of the invention this adhesive is activatable both by a simple treatment with a volatile organic solvent and by the application of heat. It is not necessary that the adhesive be both heat and solvent activatable, however, since in many cases the benefits of this invention are obtainable where the bond is activatable solely by solvent or solely by heat.

A preferred adhesive comprises a butadiene-acrylonitrile copolymer synthetic rubber having an acrylonitrile content of from 25% to 45% and a linear polymeric toughening agent which may be a vinyl chloride-vinyl acetate copolymer containing from 85% to 93% vinyl chloride, a chlorinated rubber having a chlorine content of approximately 67%, or mixtures of these. From 25 to 60 parts by weight of the linear polymeric toughener are employed with 100 parts by weight of the butadiene-acrylonitrile copolymer. The adhesive may be applied to the surface of the plastic sheet by any suitable method such as knife spreading, brushing, calendering, or other known procedure. Using a knife spreader, an 18% to 35% solids content volatile organic solvent solution of butadiene-acrylonitrile copolymer and toughener is applied to the plastic sheet. Suitably, the coating may be from 0.012 to 0.015 inch in wet thickness. The coating is dried carefully to prevent formation of bubbles during the drying step in order to provide a continuous adhesive layer. The thickness of the adhesive coating is not critical but it is important that a continuous coating be formed and ordinarily an adhesive coating of from .002 to .003 inch in dry state is provided.

While the adhesive layer 14 is not pressure sensitive, it has been found desirable to apply to the surface of the adhesive a cover sheet 16 to protect it from dirt, grease, etc., which might interfere with ultimate formation of a bond. Where such cover sheet is used it is removed before use of the laminated material. It has been found that sheet polyethylene will cling to the surfacing of the adhesive although there is no evidence of an adhesive bond being formed between the adhesive and the polyethylene sheet. It would appear that the primary force holding the polyethylene sheet in place is atmospheric pressure, substantially all air having been squeezed out from between the polyethylene sheet and the layer of adhesive. It is emphasized that while this protection is desirable to avoid contamination of the adhesive it is not essential since the adhesive is substantially non-pressure sensitive and non-tacky.

In the use of the composite sheet or wafer for repair of a torn plastic sheet material 18 (see Figs. 3 and 4) the plastic sheet material is spread out in wrinkle-free condition. The protective cover sheet 16 is removed from the surface of the adhesive and the adhesive layer 14 on the surface of the composite sheet or wafer is then brushed (as shown in Fig. 2), sprayed or otherwise treated with a volatile organic solvent for the adhesive. The activated adhesive layer 14 is pressed firmly against the surface of the plastic sheet material 18 in position to cover the torn areas of torn plastic sheet material 18 (see Fig. 3), or the line of juncture of plastic sheets 20 (see Fig. 7). It is not required that heavy pressure be employed or that the pressure be maintained for any substantial period. Extremely satisfactory bonds are obtained by simply rolling the assembled sheet materials with a small hand roller 22 as shown in Fig. 3 or otherwise pressing the sheets together to insure uniform contact between the adhesive layer 14 and the plastic sheet material to be bonded or repaired. The carrier sheet 12 may be stripped from the plastic sheet 10 carried by it immediately (see Fig. 4) or may be left in engagement with the plastic sheet for as long as may be desired. The bond between the plastic sheet 10 and the plastic sheet material 18 against which it is pressed is smooth and uniform and it has been found that in articles, such as inflatable beach balls where the bond is subjected to constant tension, no separation develops even after extended use of the ball.

Fig. 7 illustrates the use of the composite sheet of the present invention for forming a joint or seam between plastic sheets 20. As there shown, plastic sheets 20 are spread out in wrinkle-free condition with their edges abutting. The adhesive on the plastic sheet 10a is activated as described above and pressed firmly against the surface of the plastic sheets 20 in position to cover the line of juncture. The carrier sheet 12a is thereafter stripped from the plastic sheet 10a.

In the use of composite sheet material 8 where it is desired to employ heat activation for the adhesive it has been found desirable to employ a simple device 23 such as shown in Fig. 5 for applying heat from the heat source to the surface of the composite sheet. This device 23 comprises a sheet 24 of heat-insulating material which may be a sheet of corrugated cardboard having an opening 26 therein corresponding to the size of the composite sheet or wafer 8 to be applied. A disc 32 of heat-conducting material usually metal such as aluminum or brass having a diameter to fit snugly into the opening 26 is carried by the device and held in place by the resilience of the sides of the opening pressing against the edges of the disc. For convenience, sighting notches 28 are provided at spaced points on the periphery of the opening to assist in lining up the composite sheet or wafer 8. In the bonding of plastic sheet material using this device (see Fig. 6), the plastic sheet 30 to be bonded through use of the composite sheet material is spread out in wrinkle-free condition. A wafer 8 of the composite material corresponding to the size of the opening in the device is then placed with its adhesive layer 14 disposed against the portion of the sheet to be bonded. The device 23 is next placed on the sheet 30 with the disc 32 alined with the wafer 8 by means of the sighting notches 28. A source of heat which may be an ordinary household electric iron 34 is then placed with its bottom resting on the metal disc 32 to transmit heat through the metal to the surface of the carrier sheet 12 from whence it is transmitted through the plastic layer 10 to the adhesive layer 14 to activate the adhesive. It has been found that adequate activation using this device has been obtained in as little as 10 seconds although longer periods may be used if desired. The corrugated sheet 24 surrounding the opening 26 and metal insert 32 protects the body of the plastic sheet 30 being bonded from injury by the heated iron 34. That is, if the sheet 24 were not there the heat of the iron might cause the plastic sheet 30 to shrivel or to become distorted. The device is then lifted from the plastic sheet 30, the metal disc 32 being carried along by the device 23. The carrier sheet 12 is then stripped off. The bond thus formed is smooth and wrinkle-free. Since the adhered plastic sheet 10 is similar in thickness to the plastic sheet 30, the bonded area will behave when under tension in a manner similar to the remaining area and will not tend to localize stresses to cause further rupture.

In an alternative method of heat activating the laminated material, a cardboard shield 24 having an opening 26 therein as described above is employed, but no metal insert is employed to conduct heat from the source of heat to the laminated article, heat being supplied to the laminated article by radiation and/or convection from a source of heat such as an electric iron. In this procedure the adhesive layer 14 of the laminated article 8 is pressed against the plastic sheet in substantially air tight engagement therewith and the carrier sheet 12 is stripped off before activation in order that heat may pass more readily from the source of heat to the adhesive. While the adhesive layer 14 employed is not pressure sensitive nor tacky, it is sufficiently deformable so that when pressed against a plasticized resin sheet 30 the sheet 10 will be retained on the plastic sheet 30 if the carrier sheet 12 is carefully stripped off.

The following examples are given as of possible assistance in understanding the invention and it is to be understood that the examples are to be regarded as illustrative only and that the invention is not limited to the details or specific procedures employed in the examples except as defined in the appended claims:

*Example I.*—A sheet of plasticized vinyl copolymer resin containing approximately 95% of vinyl chloride (Vinylite VYNW) was formed on a super-calendered paper supporting sheet by depositing on the sheet a plastisol comprising 100 parts of the vinyl copolymer resin, and 45 parts of the plasticizer dioctyl phthalate, and heating the paper with the plastisol thereon to fuse together the particles of resin to form a continuous resin sheet in intimate clinging engagement to the paper supporting sheet, but not keyed or otherwise adhesively bonded.

An adhesive solution was prepared by forming an intimate mixture of 100 parts of a butadiene-acrylonitrile copolymer having 33% acrylonitrile content (Hycar OR 25NS) and 40 parts of a vinyl chloride-vinyl acetate copolymer having an 85% to 88% vinyl chloride content (Vinylite VYHH) and dissolving this mixture in a mixed solvent comprising 70 parts by volume of toluene and 30 parts by volume of methyl isobutyl ketone. This solution is brought to a 26% solids content by addition of further solvent mixture.

The sheet of plastic adhering to the paper supporting sheet was passed through a knife spreader and a coating of 0.015 inch wet thickness of the adhesive was spread on the free surface of the vinyl resin sheet. The coating was dried by passing it through an oven and circulating air around it at a temperature of 160° to 170° F. for six minutes. A coating of approximately 0.003 inch in thickness was obtained.

A wafer one inch in diameter was cut from this composite and brushed with a solvent comprising 20% by volume of cyclohexanone and 80% by volume of methyl ethyl ketone. After 20 seconds the wafer was positioned with the activated adhesive surface over a tear in a sheet of a 12 gage flexible plasticized vinyl chloride-vinyl acetate copolymer resin sheet containing about 95% vinyl chloride and rolled into intimate contact with the resin sheet by a hand roller. The paper supporting sheet was then stripped off, the resin disc being firmly adhered to the plasticized vinyl copolymer resin sheet by the adhesive. A strong bond was formed immediately such that the resin disc could not be stripped from the plasticized copolymer resin sheet without damaging the sheet and the resin disc.

*Example II.*—A two inch wafer of composite adhesive sheet material prepared as described in Example I was positioned over a tear in a 12 gage flexible plasticized vinyl chloride-vinyl acetate copolymer resin sheet containing about 95% vinyl chloride and smoothed into intimate contact with the resin sheet by a hand roller. The device 23 shown in Fig. 5 was placed over the wafer of composite adhesive sheet material with the metal disc 32 alined with the composite wafer. A household electric iron was placed on the metal disc until the metal disc reached a temperature of about 250° F. and maintained in contact therewith for about 20 seconds after which it was removed. The device 23, including the metal disc 32, was then lifted from the surface of the composite adhesive sheet wafer and the paper supporting sheet 12 stripped from the resin disc 10. A strong bond was formed immediately such that the resin disc 10 could not be stripped from the copolymer resin sheet without destroying the copolymer resin sheet.

*Example III.*—An adhesive solution was prepared comprising 100 parts of a butadiene-acrylonitrile copolymer having an acrylonitrile content of 26% (Paracril 26), 25 parts of a mineral filler (Dixie Clay), 10 parts of a finely powdered silica gel (Santocel CX), 50 parts of chlorinated rubber having a chlorine content of 67% and a viscosity of 125 centipoises (Parlon 25), and 10 parts of a vinyl chloride-vinyl acetate copolymer having a vinyl chloride content of 88.5% to 90.5% (Vinylite VYNS) in a solvent comprising 75 parts by volume of a mineral oil solvent (Solvesso 100) and 25 parts by volume of cyclohexanone. The solution was brought to a solids content of 25%.

This solution was coated on a vinyl resin sheet carried by a super-calendered paper sheet and dried as in Example I, and a wafer one inch in diameter was cut from the composite adhesive sheet material. This wafer was positioned over a small hole in a 12 gage sheet of plasticized flexible vinyl chloride-vinyl acetate copolymer resin containing about 85% of vinyl chloride and was rolled into intimate contact with the resin sheet by a hand roller. The supporting paper was then gently peeled off the sheet resin disc, the resin disc being held apparently by vacuum to the surface of the plasticized vinyl copolymer resin sheet. A corrugated cardboard sheet having a hole one inch in diameter was positioned with the hole in alinement with the sheet resin disc. A household iron heated to approximately 482° F. was then positioned over the hole in the corrugated cardboard sheet and maintained there for approximately 45 seconds. The iron was then removed and the corrugated cardboard sheet lifted from the resin sheet. The resin disc was strongly bonded to the plasticized copolymer resin sheet and could not be removed from the resin sheet without destroying the resin sheet.

Having described my invention, what I claim as new and desire to secure by Letters Patent of the United States is:

1. A composite sheet manipulatable as a unit for the assembly and lamination of thin plastic sheet material, said composite comprising the combination of a flexible, relatively stiff, smooth-surfaced, supporting sheet, selected from the group consisting of paper and Cellophane, a thin sheet of flexible waterproof vinyl resin having a smooth surface in intimate clinging engagement with but not adhesively bonded to the smooth surface of said supporting sheet, and a dry film of activatable, substantially non-tacky adhesive bonded to and coextensive with the surface of said thin vinyl resin sheet which is not in contact with the supporting sheet, the engagement between said supporting sheet and said thin sheet of vinyl resin being sufficiently strong to hold said sheet of vinyl resin in wrinkle-free condition against the wrinkling and curling forces of activation, but said engagement being so weak as to be readily ruptured to permit the supporting sheet to be readily stripped from the vinyl resin sheet.

2. A composite sheet material manipulatable as a unit for the assembly and lamination of thin plastic sheet material, said composite comprising a combination of a flexible, relatively stiff, smooth-surfaced, paper supporting sheet, a thin sheet of flexible, waterproof vinyl resin having a smooth surface in intimate clinging engagement with but not adhesively bonded to the smooth surface of said supporting sheet, and a dry film of activatable, substantially non-tacky adhesive bonded to and coextensive with the surface of said resin sheet which is not in contact with the supporting sheet, the engagement between said supporting sheet and said thin sheet of resin being sufficiently strong to hold said sheet of resin in wrinkle-free condition against the wrinkling and curling forces of activation, but said engagement being so weak as to be readily ruptured to permit the supporting sheet to be readily stripped from the resin sheet.

3. A composite sheet manipulatable as a unit for the assembly and lamination of thin plastic sheet material, said composite comprising the combination of a flexible, relatively stiff, smooth-surfaced, paper supporting sheet, a thin sheet of flexible, waterproof vinyl resin having a smooth surface in the intimate clinging engagement obtained by forming said resin sheet from a fluid mass of resin directly on said supporting sheet, said resin sheet not being adhesively bonded to the smooth surface of said supporting sheet, and a dry film of activatable, substantially non-tacky adhesive bonded to and coextensive with the surface of said resin sheet which is not in contact with the supporting sheet, the engagement between said supporting sheet and said thin sheet of vinyl resin being sufficiently strong to hold said sheet of resin in wrinkle-free condition against the wrinkling and curling forces of activation, but said engagement being so weak as to be readily ruptured to permit the supporting sheet to be readily stripped from the resin sheet.

4. A composite sheet manipulatable as a unit for the assembly and lamination of thin plastic sheet material, said composite comprising the combination of a flexible, relatively stiff, smooth-surfaced, paper supporting sheet, a thin sheet of flexible, waterproof vinyl resin having a smooth surface in the intimate clinging engagement obtained by forming said resin sheet from a fluid mass of resin directly on said supporting sheet, said resin sheet not being adhesively bonded to the smooth surface of said supporting sheet, a dry film of activatable, substantially non-tacky adhesive bonded to and coextensive with the surface of said resin sheet which is not in contact with the supporting sheet, and a layer of polyethylene sheet material in clinging engagement with said film of adhesive but readily removable therefrom, the engagement between said supporting sheet and said thin sheet of vinyl resin being sufficiently strong to hold said sheet of resin in wrinkle-free condition against the wrinkling and curling forces of activation, but said engagement being so weak as to be readily ruptured to permit the supporting sheet to be readily stripped from the resin sheet.

5. The method of applying a lamina of thin, plastic sheet material which comprises providing a readily manipulatable composite of a thin flexible waterproof vinyl resin sheet in intimate clinging engagement with but not adhesively bonded to the surface of a flexible, relatively stiff, smooth-surfaced supporting sheet, selected from the group consisting of paper and cellophane sheet material, said vinyl resin sheet having a dry film of activatable, substantially non-tacky adhesive bonded to and coextensive with the surface of said vinyl resin sheet which is not in contact with the supporting sheet, the engagement between said supporting sheet and said thin sheet of vinyl resin being sufficiently strong to hold said sheet of resin in wrinkle-free condition against the wrinkling and curling forces of activation, but said engagement being so weak as to be readily ruptured to permit the supporting sheet to be stripped readily from the resin sheet, activating said adhesive, positioning said composite with the film of adhesive against a surface to be laminated whereby said vinyl resin sheet of the composite is secured in wrinkle-free adhesive engagement with the surface to be laminated, and stripping said supporting sheet from said vinyl resin sheet.

6. The method of applying a lamina of thin, plastic sheet material which comprises providing a readily manipulatable composite of a sheet of thin flexible, waterproof vinyl resin in intimate clinging engagement with but not adhesively bonded to the surface of a flexible, relatively stiff, smooth-surfaced paper supporting sheet, said resin sheet having a dry film of activatable, substantially non-tacky adhesive bonded to and coextensive with the surface of said resin sheet which is not in contact with the supporting sheet, activating said adhesive, the engagement between said supporting sheet and said thin sheet of vinyl resin being sufficiently strong to hold said sheet of resin in wrinkle-free condition against the wrinkling and curling forces of activation, but said engagement being so weak as to be readily ruptured to permit the supporting sheet to be stripped readily from the resin sheet, positioning said composite with the layer of adhesive against a surface to be laminated whereby said resin sheet of the composite is secured in wrinkle-free adhesive engagement with the surface to be laminated, and stripping said supporting sheet from said plastic sheet.

7. The method of applying a lamina of thin, plastic sheet material which comprises providing a readily manipulatable composite of a sheet of thin flexible, waterproof vinyl resin in intimate clinging engagement with but not adhesively bonded to the surface of a flexible, relatively stiff, smooth-surfaced paper supporting sheet, said resin sheet having a dry film of solvent activatable, substantially non-tacky adhesive bonded to and coextensive with the surface of said resin sheet which is not in contact with the supporting sheet, the engagement between said supporting sheet and said thin sheet of vinyl resin being sufficiently strong to hold said sheet of resin in wrinkle-free condition against the wrinkling and curling forces of activation, but said engagement being so weak as to be readily ruptured to permit the supporting sheet to be stripped readily from the resin sheet, applying a volatile solvent to activate said adhesive, positioning said composite with the layer of adhesive against a surface to be laminated whereby said resin sheet of the composite is secured in wrinkle-free adhesive engagement with the surface to be laminated, and stripping said supporting sheet from said resin sheet.

8. The method of applying a lamina of thin, plastic sheet material which comprises providing a readily manipulatable composite of a sheet of thin flexible, waterproof vinyl resin in intimate clinging engagement with but not adhesively bonded to the surface of a flexible, relatively stiff, smooth-surfaced paper supporting sheet, said resin sheet having a dry film of heat-activatable, substantially non-tacky adhesive bonded to and coextensive with the surface of said plastic sheet which is not in contact with the supporting sheet, the engagement between said supporting sheet and said thin sheet of vinyl resin being sufficiently strong to hold said sheet of resin in wrinkle-free condition against the wrinkling and curling forces of activation, but said engagement being so weak as to be readily ruptured to permit the supporting sheet to be stripped readily from the resin sheet, pressing said composite with the layer of adhesive against a surface to be laminated, supplying heat to activate said adhesive whereby said resin sheet of the composite is secured in wrinkle-free adhesive engagement with the surface to be laminated, and stripping said supporting sheet from said resin sheet.

9. The method of applying a lamina of thin, plastic sheet material which comprises providing a readily manipulatable composite of a sheet of thin flexible, waterproof vinyl resin in intimate clinging engagement with but not adhesively bonded to the surface of a flexible, relatively stiff, smooth-surfaced paper supporting sheet, said resin sheet having a dry film of heat-activatable, substantially non-tacky adhesive bonded to and coextensive with the surface of said plastic sheet which is not in contact with the supporting sheet, the engagement between said supporting sheet and said thin sheet of vinyl resin being sufficiently strong to hold said sheet of resin in wrinkle-free condition against the wrinkling and curling forces of activation, but said engagement being so weak as to be readily ruptured to permit the supporting sheet to be stripped readily from the resin sheet, pressing said composite with the layer of adhesive against a surface to be laminated, stripping said supporting sheet from said plastic sheet and thereafter supplying heat to activate said adhesive whereby said plastic sheet of the composite is secured in wrinkle-free engagement with the surface to be laminated.

References Cited in the file of this patent

UNITED STATES PATENTS

| Number | Name | Date |
| --- | --- | --- |
| 1,891,323 | Eisenberg | Dec. 20, 1932 |
| 2,238,073 | Patten | Apr. 15, 1941 |
| 2,284,944 | Bruning | June 2, 1942 |
| 2,394,701 | Laws | Feb. 12, 1946 |
| 2,427,647 | Vahlteich | Sept. 16, 1947 |
| 2,459,279 | Holden | Jan. 18, 1949 |
| 2,484,566 | Hiller et al. | Oct. 11, 1949 |
| 2,497,146 | Warren | Feb. 14, 1950 |
| 2,558,804 | Wittgren | July 3, 1951 |
| 2,578,150 | Rathke | Dec. 11, 1951 |

FOREIGN PATENTS

| Number | Country | Date |
| --- | --- | --- |
| 26,706 | Great Britain | of 1910 |
| 551,440 | Great Britain | Feb. 23, 1943 |